Nov. 5, 1946.  E. CANNON  2,410,712
CONTROL FOR HYDRAULIC PRESSES
Filed June 30, 1943  3 Sheets-Sheet 2
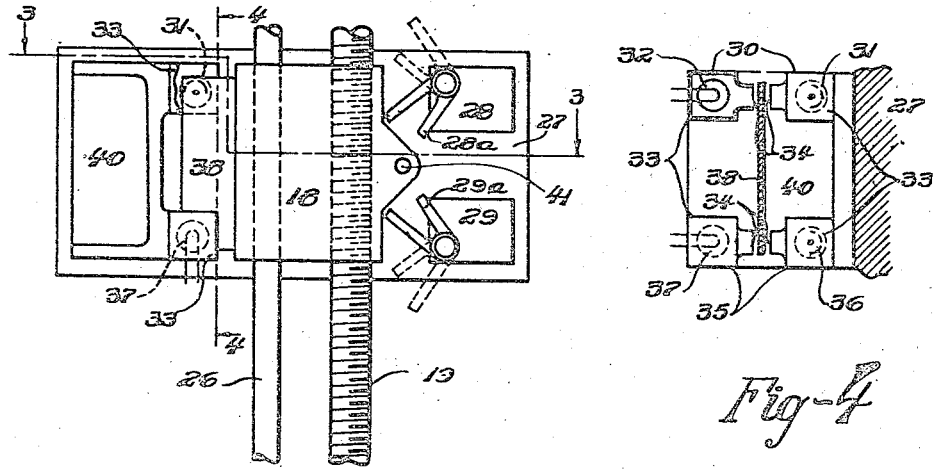
Fig-2
Fig-4
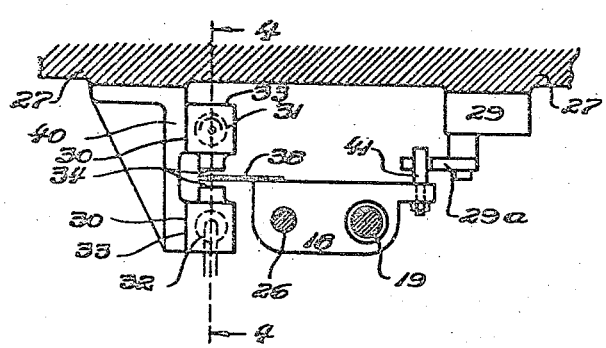
Fig-3
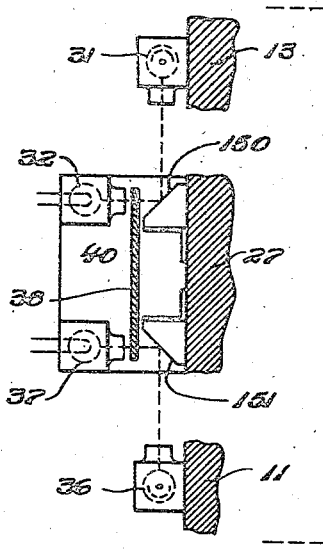
Fig-6
INVENTOR
EARL CANNON
BY
Fraser, Myers & Menly
ATTORNEYS Patented Nov. 5, 1946

2,410,712

UNITED STATES PATENT OFFICE 2,410,712

CONTROL FOR HYDRAULIC PRESSES

Earl Cannon, Rockville Centre, N. Y., assignor to E. W. Bliss Company, Brooklyn, N. Y., a corporation of Delaware Application June 30, 1943, Serial No. 492,863

23 Claims. (Cl. 121—41)

1

This invention relates to operating controls for hydraulic presses of the character which enable a press operator to cause the reciprocating platen or slide of a hydraulic press to pursue a partial stroke in either of opposite directions and to control, very easily, the amplitude of such a partial stroke with a high degree of precision. Press operation adapted to yield such a partial stroke is referred to hereinafter as "inching" operation. More particularly, the invention relates to electrical inching controls for hydraulic presses having the mentioned attribute of precision control and which, also are adapted for easy conversion from control of inching operation of the press to control of normal press operation which may be fully or partly automatic.

The objects of the invention and important principles employed therein

An important object of the present invention is the provision of improved means for controlling the inching of the press slide to facilitate, for example, the setting of dies in the press.

Another important object of the invention is the provision of inching control means which, while depending upon the movement or position of the press slide for limiting the inching thereof, nevertheless, have no parts which are so directly connected to the slide as to require any bodily displacement thereof in order to convert the press from inching to normal operation, or vice versa.

The foregoing objects and others which may be perceived from the following specification and the accompanying drawings are achieved, according to the present invention, by providing means for controlling normal operation of the press and an electrical inching control system which may, if desired, comprise portions of the mentioned normal control system, and in which circuits, controlling the inching movement of the press slide, may be established or broken by the movement of the slide relatively to certain portions of apparatus comprising the inching control system. Among expedients available for the purpose, photoelectric cells may be employed advantageously in circuits of such inching control systems and the light rays controlling the operation of said cells may either be intercepted or passed by a member arranged to operate as a shutter in response to movement of the press slide.

In the accompanying drawings:

Figure 1 is a perspective view of a hydraulic press, including inching control apparatus, which, although in perspective, nevertheless af-

2 fords substantially a side elevational view of such apparatus;

Fig. 2 is an enlarged side elevational view, partly broken away, of certain important mechanisms illustrated in Fig. 1;

Fig. 3 is a horizontal sectional view substantially on the irregular lines 3—3 of Figs. 1 and 2;

Fig. 4 is a vertical sectional view substantially on the lines 4—4 of Figs. 1, 2, and 3;

Fig. 6 is a vertical sectional view, of substantially the same character as Fig. 4, illustrating portions of a second embodiment of the invention.

General description of press and inching control apparatus

Figure 1:
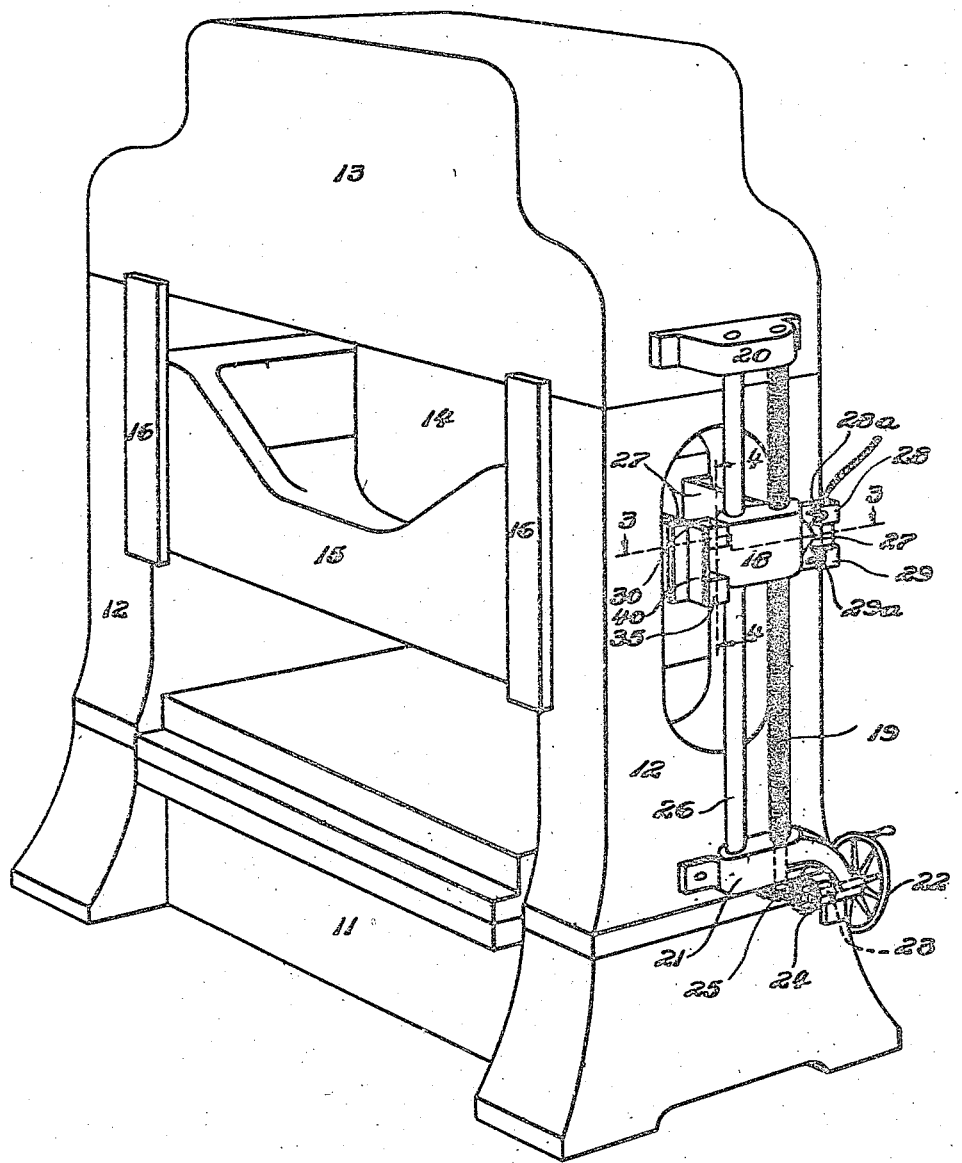

Referring first to Fig. 1, the hydraulic press may comprise a base 11, tied in spaced relationship, by side pieces 12, to a crown 13 within which may reciprocate a ram 14 on the lower end of which is fixed a horizontal slide 15 which may be guided by jibs 16. The side pieces 12, themselves, may serve directly as the connection between the base and crown of the press, or, if desired, the said side pieces may serve as spacing members within which may be disposed suitable tie rods 17 which, as shown diagrammatically in Fig. 5, may be secured to both the base and crown of the press in a well understood manner. Also, if desired, the side pieces 12 may be omitted and the tie rods adapted to serve both as spacing members and tie rods or tension members.

The mechanism which responds directly to control by the operator comprises a broadened traveling nut 18, threaded upon a vertical screw 19, unthreaded portions at or near the ends of which are retained within suitable thrust bearings in brackets 20 and 21, fixed upon the side of the press, preferably at the crown and base thereof, respectively. The screw 19 may be rotated conveniently, by the press operator, by means of a hand wheel 22 which is suitably keyed to one end of and turns a shaft 23, to the other end of which is keyed a bevel gear 24 which meshes with and drives a bevel gear 25 with which the screw 19 is constrained to turn. The traveling nut 18 is constrained against rotating with the screw 19, by a vertical guide rod 26, which is suitably fixed at its opposite ends within or upon the brackets 20, 21 and extends, with a sliding fit, through a suitable vertical bore in the nut 18; hence, rotation of the handwheel 22, by the operator, causes the nut 18 to travel up or down upon the screw 19, depending upon the direction in which the handwheel is turned.

On the adjacent end of the slide 15 or upon an extension 27 fixed or formed thereon, there may be fixedly mounted a pair of toggle switches 28, 29 and a pair of photoelectric cell assemblies 30, 35, all adapted to coact, in a manner hereinafter explained, with certain members fixed upon the traveling nut 18.

The two mentioned cell assemblies may be carried, in superposed relationship, upon a bracket 40 which is fixed to the extension 27 of the press slide. A vertical opaque shutter member 38 is fixed upon one side of the traveling nut 18, adjacent the cell assemblies, and extends between photo-electric cells 31, 36 of the two cell assemblies, and light sources in said assemblies in the form of incandescent lamps 32, 37. The said shutter, preferably, is of such vertical dimension as to be barely capable of instantaneously blocking off the passage of light from both said lamps to their related cells and to permit passage of light to one or the other of said cells upon being moved upwardly or downwardly relatively to the latter. The several mentioned cells and lamps, preferably, are mounted within box-like housings 33, which are fixed upon the bracket 40 and are provided with opposed apertures 34 which, except when closed off by the shutter 38, are adapted to pass light rays between the related lamps and cells.

The toggle switches 28, 29, have V-shaped pivotally movable operating members 28a, 29a, respectively, which are so disposed in the line of movement of an actuating pin 41 fixed to and extending inwardly from the traveling nut 18 that, when said nut is moved downwardly on screw 19 by turning of the wheel 22, the pin 41 may engage the lower arm of the operating member 29a and impart a snap movement thereto to shift it from its solid line position, (Fig. 2) in which the switch 29 is closed, to its broken line position, in which said switch is open. A subsequent reverse movement of said nut causes the pin 41 to engage the upper arm of the member 29a to close the switch 29. Likewise when the nut 18 is moved upwardly on the screw 19, the pin 41 may actuate the member 28a to open the switch 28 and a subsequent reverse or downward movement causes the pin 41 to close the switch 28. As hereinafter explained, operation of the apparatus may be such that the pin 41 will remain between and out of engagement with the operating members 28a and 29a, thereby leaving both switches 28 and 29 in their normally closed positions.

Hydraulic system for operating the press

An enlarged portion or head 14a, formed on the upper end of the ram 14 works within a cylinder 42 and, with the latter, defines a ram advance chamber 43 and a return chamber 44, which are connected, respectively, by pipe lines 45, 46, to annular chambers 47, 48, in a distributing valve 49. A pump 50, which may be suitably driven continuously, as by an electric motor (not shown), draws liquid through a pipe line 51 from a tank 52, which may conveniently be constructed upon the top of the press, and discharges such liquid, through a pipe line 53, into an annular chamber 54 in the valve 49. A pair of annular chambers 55, 56 are connected by a pipe line 57 to the tank 52.

The distribution of liquid through the valve 49 is controlled by the movement of a piston 49a comprising a shank 58 and piston heads 59, 60, and 61, preferably formed integrally upon said shank in suitable spaced relationship. Lateral passages 62, 63, 64, extend diametrically completely through said piston heads and are connected by a longitudinal passage 65 within the shank 58.

The piston 49a may be shifted to upper or lower extreme positions by oppositely acting electric solenoids 66, 67 which are coupled by a link 68, and both connected by a link 69 to one end of a lever 70, fulcrumed, at an intermediate point thereof, upon a bracket 71 which may be mounted upon the casing of the valve 49. The other end of the lever 70 is connected, by a link 72, to the protruding upper end of the piston 49a. When neither of said solenoids is energized, the piston may be held yieldably in a center or neutral position by a suitable centering spring device 73 enclosed within the lower end of the casing of the valve 49.

When the piston 49a is in its lowermost position, the several piston heads 59, 60, 61 guide liquid from the pump 50, into the ram advance chamber 43 to yield a down or advance stroke of the press slide 15 the liquid from return chamber 44, meanwhile, exhausting through the valve 49 into the tank 52. When the piston is in its uppermost position, the several piston heads guide liquid from the pump, into the return chamber to yield an up or return stroke of the slide, the liquid from the advance chamber, meanwhile, exhausting through the valve 49 into the tank. When the piston is in its center or neutral position as shown in Fig. 5, the liquid from the pump passes into lateral passage 63, and thence, through longitudinal passage 65, and lateral passages 62, 64 into the pipe line 57 which carries it to the tank, hence, when the piston 49a is in its center position the slide 15 is not hydraulically actuated in either direction.

The press system as a whole

Figure 5:
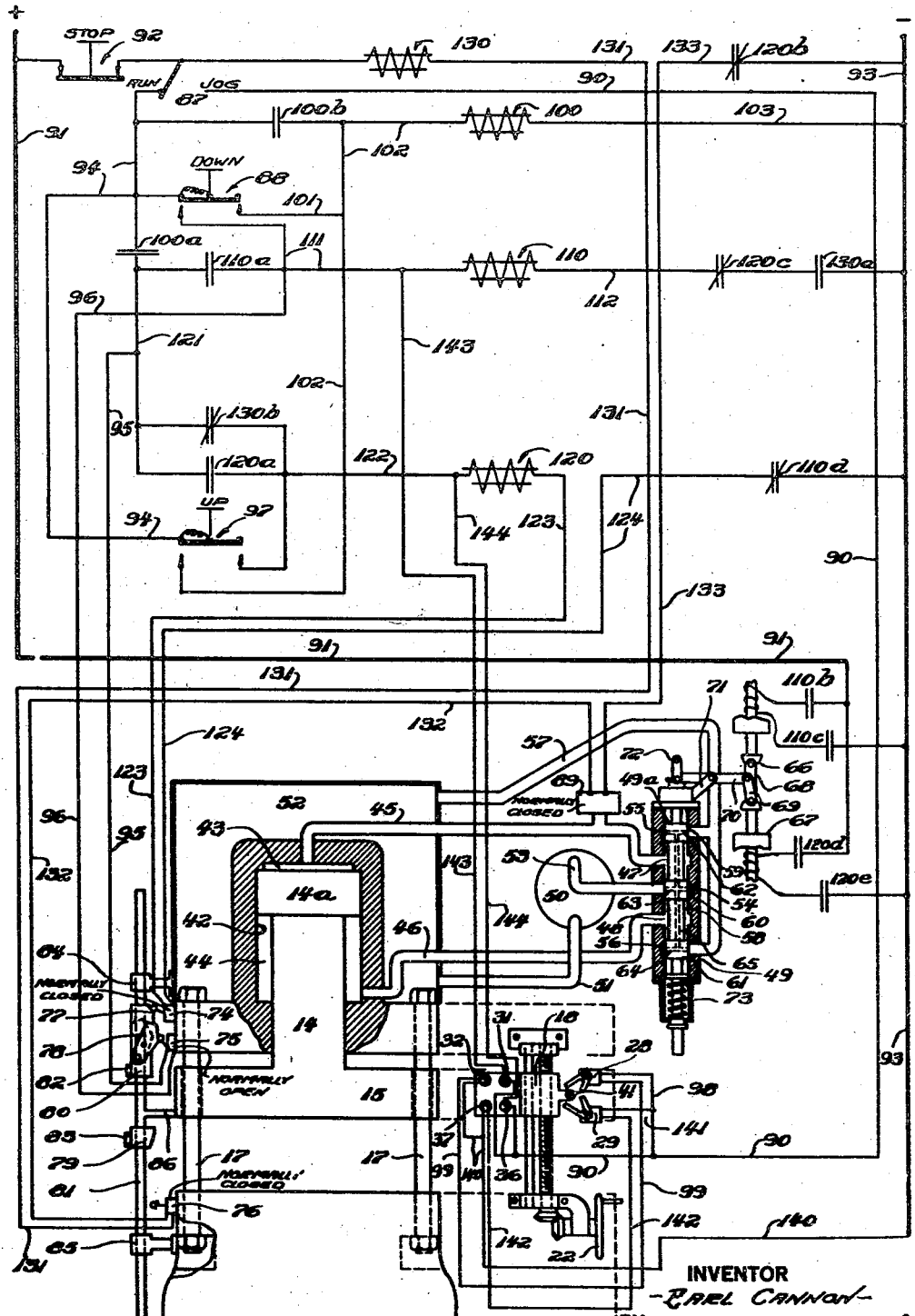
Fig. 5 is a diagram of a hydraulic press system according to the present invention, including electric controls for both normal and inching operation of a press.

The press system may be understood, practically in its entirety, by reference to Fig. 5, which includes not only the apparatus already described in detail but also an electric system for controlling the press.

For the sake of simplicity, in Fig. 5, certain electric switch contactor controlling relays, instead of being shown in their assembled relationship with their contactors in proper juxtaposition with reference to the coils operating them, are shown with the coils in their clearly defined circuits and the contactors in circuits, also clearly defined, which they control. The said relay coils are diagrammatically indicated as coils having a movable core indicated by double lines and the contactors are indicated by parallel lines located in the circuits which they control. Normally closed contactors (i. e., closed when the related coil is deenergized) further, are identified by a diagonal line crossing said parallel lines, and normally open contactors are identified by the absence of such a diagonal line. The reference character applied to each of such contactors includes the number used as the reference character of the relay coil controlling its operation; and the reference characters of different contactors operated by any one relay coil include distinguishing suffixes, a, b, c, etc.

Limit switches 74, 75, 76, functioning in electric circuits as hereinafter explained, may be fixed upon non-moving parts of the press in suitable juxtaposition to the line of movement of dogs 77, 78, 79, which, respectively, are adapted to operate said switches. Switches 74 and 76 are normally closed (i. e., closed except when engaged and operated by its related dog) and switch 75 is normally open. Dog 77 may be in the form of a side portion of an elongated sleeve 80 and the dog 79 may comprise a short sleeve, said sleeves being slidable upon a vertical reciprocating rod 81 and adapted to be held in any desired position upon said rod by set screws 82, 83, respectively, or by other suitable holding means.

The dog 78 may be pivotally mounted upon the sleeve 80 to pivot between the operative position shown in full lines, in which it may operate the switch 75, and an inoperative position shown in broken lines in which its path of vertical movement is clear of the operating arm of said switch and, hence, may not operate the latter. Suitable locking means are provided, of course, to hold the dog 78 in either of the two mentioned positions. The rod 81 works within guide collars 84, 85 fixed to non-movable side portions of the press and is constrained to reciprocate with the press slide 15 by being fixed to one side of the latter or an extension thereof as, for example, by a lateral extension rod 86.

A pressure actuated electric switch 89 is connected to the pipe line 45. The contacts of this switch are normally closed to complete an electric circuit according to the diagram except when the pressure in the ram advance chamber 43 rises above a predetermined pressure, at which the said switch may be adjusted to respond and open said circuit.

*Automatic operation of the press system*

Let it be assumed that the press is idle, has been properly fitted with dies, and that it is desired to cause automatic operation of the press wherein the slide 15 will automatically reciprocate to close and open the press repeatedly until stopped by the operator. The operator first makes certain that the pivotal dog 78 is in the operative position thereof, indicated in full lines in Fig. 5 and that the run-jog switch 87 is set at "run" position. It may be assumed, also, that all parts of the press and the hydraulic system are at rest in the positions shown in said figure.

Two things should be observed; first, that, because of the setting of the switch 87 to "run" position, there is no circuit through wire 90 or through toggle switches 28, 29, lamps 32, 37, or cells 31, 36 connected to said wire, and, hence, in automatic operation of the press, said enumerated elements are inactive regardless of the position of the nut 16 relatively to the press slide 15; and, second, when the press slide is at rest at the top of its stroke and during its down stroke, relay coil 130, is in energized condition, being in a circuit extending from main lead 91 through normally closed stop switch 92, relay coil 130, wire 131, normally closed limit switch 76, wire 132, normally closed pressure switch 89, wire 133, and normally closed contactor 120b to main lead 93.

To start the automatic operation of the press, from its open position, button switch 88 is momentarily pressed and closed to establish a first circuit, from lead 91 to lead 93, including stop switch 92, run-jog switch 87, wire 94, down switch 88, wires 101, 102, relay coil 100, and wire 103. This first circuit energizes coil 100, thereby closing contactor 100b to bridge switch 88 and thus maintain said circuit after said switch is released and opened, and also closing contactor 100a.

The momentary pressing and closing of switch 88 also establishes a second circuit, from lead 91 to lead 93, including switches 92 and 87, wire 94, switch 88, wire 111, relay coil 110, wire 112 and then closed contactors 120c and 130a. This second circuit energizes coil 110, thereby closing contactor 110a to establish, with the closed contactor 100a, a bridge circuit around switch 88 and thus maintain said second circuit after switch 88 is released. The energizing of coil 110 also opens contactor 110d, thereby assuring that relay coil 120, which, as hereinafter explained, serves as a primary control of the return stroke of the press, may not become energized while coil 110 is energized to effect the advance stroke of the press.

The energizing of coil 110 also closes contactors 110b and 110c, completing a circuit from lead 91 to lead 93 through solenoid 66, thereby energizing the latter and causing the latter's core to move upwardly and actuate the lever 70 to move the valve piston 49a to its lowermost position. When the piston is in the latter position the valve 49 directs the liquid output of the pump 50 into the advance chamber 43 to move the press slide 15 downwardly while liquid exhausted from the return chamber 44 passes through said valve to the tank 52.

In the particular control system shown in Fig. 5, the extent of the down or advance stroke of the slide 15 may be limited either by pressure built up in advance chamber 43, as by engagement of a blank between two dies having pressing portions working in a common vertical line, or by reason of the said slide having reached a predetermined position in its advance stroke in circumstances wherein, for example, the forming of the blank is accomplished by dies which partially telescope without materially raising the pressure in said advance chamber at the lower end of the press stroke. The mentioned pressure limitation of the advance stroke is controlled by the normally closed pressure switch 89 which is hydraulically connected in the pipe line 45 to render it responsive to the pressure in chamber 43 and the mentioned slide position limitation of the advance stroke is controlled by the normally closed limit switch 76 which may be opened by the dog 79 which, of course, is locked in such position on the rod 81 as to yield operation of the switch 76 at the desired point in the advance stroke of the press slide. It should be remembered that the switches 89 and 76 are in series in the electric circuit through relay coil 130.

When the press slide reaches the point in its advance stroke at which the forming operation has been completed, one or the other of switches 89, 76, depending ordinarily upon the predetermination of the operator, will be opened by the accumulation of pressure in chamber 43 sufficient to operate switch 89 or by engagement of the dog 79 with the operating arm of switch 76. The opening of either of these switches breaks the circuit through relay coil 130, deenergizing the latter and, in consequence, opening contactor 130a and closing contactor 130b. The opening of contactor 130a breaks the described circuit through coil 110, thereby deenergizing the latter and, in consequence, opening contactor 110a, closing contactor 110d, and also opening contactors 110b, 110c to deenergize solenoid 66.

The mentioned closing of contactor 130b completes a circuit from lead 91 to lead 93, including switches 92 and 87, wire 94, contactor 100a (closed because of the fact that coil 100 is maintained in energized condition at all times during automatic operation), wire 121, contactor 130b, wire 122, relay coil 120, wire 123, then closed limit switch 74, wire 124, and then closed contactor 110d. This circuit energizes coil 120, whereupon contactor 120a closes, to bridge contactor 130b, and contactors 120b and 120c open, thus assuring that coils 130 and 110 will remain deenergized during the return stroke of the press. The energizing of coil 120 also closes contactors 120d and 120e thereby establishing a circuit from lead 91 to lead 93 through solenoid 67 and energizing the latter.

The mentioned deenergizing of solenoid 66 and the energizing of solenoid 67 so soon thereafter as to constitute almost simultaneous operation of the two, causes the valve piston 49a to move from its lowermost to its uppermost position to direct liquid from the pump 50 into the return chamber 44 to move the press slide upwardly while liquid from the advance chamber 43 passes through the valve 49 to the tank 52.

As the slide 15 starts to move upwardly the condition of pressing pressure in chamber 43 or of position of the slide 15, which operated one or the other of switches 76, 89 to terminate the advance stroke, no longer obtains and hence both said switches resume their closed setting in series in the circuit through coil 130 but that circuit is not completed during the return stroke of the slide due to the fact that contactor 120b is held open by coil 120 which is in energized condition to effect the return stroke of the slide.

As the slide 15 approaches the end of its return stroke, the dog 78 engages the operating arm of limit switch 75 and closes the latter thus establishing a connection through wires 95, 96, and 111 between the wire 121 and one side of the coil 110. A circuit through the latter coil, however, is completed only when the slide, continuing to the end of its return stroke, moves dog 77 into engagement with the operating arm of limit switch 74 to open the latter and thereby open the circuit through coil 120 and deenergizing the latter.

The deenergizing of coil 120 opens contactors 120d and 120e to deenergize solenoid 67; also causes contactor 120b to close to complete the circuit through coil 130 and thus close contactor 130a. The deenergizing of coil 120 also closes contactor 120c, thus establishing a circuit through coil 110 from line 91 to line 93, including switches 92 and 87, wire 94, contactor 100a, wires 121 and 95, switch 75, wires 96 and 111, coil 110, wire 112 and contactors 120c and 130a. This circuit through coil 110 energizes the latter and thus closes contactors 110b, 110c to again energize solenoid 66.

The energizing of solenoid 66 immediately after the mentioned deenergizing of solenoid 67 causes the valve piston 49a to again shift to its lowermost position to cause the pumped liquid to repeat the downward or advance movement of the press slide. The described automatic reversal of the stroke of the slide 15 at its opposite limits of movement thus causes the slide to reciprocate automatically until stopped by the momentary opening of press button switch 92 which breaks all circuits. After the button of switch 92 is released permitting the latter to close, all circuits remain broken, excepting the circuit through coil 130, thus preventing restarting of the press except as controlled by the operator in some suitable manner, as, for example, in the manner hereinbefore described. Although it may seldom be desired to start the described automatic operation of the press from a condition in which its slide is at rest at the bottom of its stroke, nevertheless, such operation may be started by momentarily pressing and closing button switch 97 which closes a circuit through coil 120 to start the return stroke of the press in the same manner as the described closing of switch 88 operated to close a circuit through coil 110 to start automatic operation of the press from its open position. Automatic operation may be started from an intermediate slide position by closing either switch 88 to start operation with a downward slide movement or switch 97 to start operation with an upward slide movement.

Ordinarily, it is desirable to start automatic operation of the press from its open position as hereinbefore described in detail and if the press slide is in any other than its uppermost position it may readily be moved to its uppermost position by the inching control system the operation of which is described hereinafter in detail.

*Semi-automatic operation of the press system*

If it is desired to have the press under semi-automatic control, wherein the slide may be caused to advance and automatically return to open position and then come to rest, it is only necessary for the operator to set and lock the dog 78 in the position indicated in broken lines, in Fig. 5, on the sleeve 80. As thus set, the dog 78 will not operate the switch 75 on the return stroke of the slide 15 and consequently the described repeating circuit through coil 110 will not be established to again bring the solenoid 66 into operation to move the slide downwardly. Thus, with the dog 78 set in the last indicated manner, the starting of each operating cycle (i. e., the starting of advance movement of the press slide) may be accomplished only by the closing of button switch 88 by the operator.

It may readily be perceived that, in either automatic or semi-automatic operation of the press system, as hereinbefore described, the strokes of the slide 15 are relatively rapid and uninterrupted in contrast to inching operation, as hereinafter described, wherein the advance and return movements of said slide may be minutely controlled both as to the speed and the extent of such movements.

*Inching operation of the press system*

The operation of the inching control system may best be understood by first observing from the foregoing description, and from Fig. 5, that energizing of coil 110 with the resultant closing of contactors 110b and 110c is necessary in order to energize solenoid 66 to cause the valve 49 to so direct pumped liquid as to move the press slide 15 downwardly and that energizing of coil 120 with the resultant closing of contactors 120d and 120e is necessary to energize solenoid 67 to operate the valve 49 oppositely, to move the slide 15 upwardly.

It is helpful, also, to observe that when the slide 15 is at the top of its stroke, open limit switch 74 renders it impossible, by any illustrated automatic or inching control means, to energize coil 120 to tend to urge the slide further upwardly; and, when said slide is at the bottom of its stroke, open limit switch 76 or pressure switch 89 or both said switches, render it impossible, by any illustrated automatic or inching control means, to energize coil 130, and, hence, impossible for contactor 130a to close so that coil 110 may not be energized to tend to urge the slide further downwardly. The said switches, however, do not interfere with the operation of controls causing downward movement of the slide from its uppermost or an intermediate position, or with the operation of controls causing upward movement of the slide from its lowermost or an intermediate position.

It may also be observed that in the connections between lead 93 and coils 110 and 120, respectively, there are included normally closed contactors 120c and 110d functioning as safeguards to prevent closing of a circuit through one of said coils when the other coil is energized. These contactors also function similarly as safeguards in automatic operation of the press.

Let it be assumed that the press slide 15 is at rest in its uppermost or in an intermediate position and that it is desired to move the slide downwardly an inch or a fraction thereof at a time, within absolute control of the operator, as a part of the setting of dies in the press. The operator first sets the run-jog switch 87 at "jog" position. This, through the medium of controls hereinafter described, causes the slide 15 to move to and come to rest automatically at an aligned position relatively to the traveling nut 18 in which position the shutter 38 closes off the light paths from the lamps 32, 37 to related cells 31, 36, respectively. The said nut, at that time, would ordinarily be at a point on the upper portion of the screw 19 where the operator probably would have left it after previously using the inching controls. If the slide happens to be in such aligned position when the operator sets the switch 87 at "jog" position, the slide will remain in that position pending further manipulation of the inching controls by the operator.

The setting of the switch 87 at "jog" position, establishes a lighting circuit which, when the slide 15 is in the mentioned aligned position, extends through incandescent lamps 32, 37, from lead 91 to lead 93, including switches 92 and 87, and wire 90, from which two parallel circuits are carried to lead 91; one parallel circuit extending through wire 98, then closed toggle switch 28, wire 99, lamp 32, and wire 140, to lead 93, and the other parallel circuit extending through wires 98 and 141, then closed toggle switch 29, wire 142, lamp 37, and wire 140, to lead 93.

The operator then turns the handwheel 22, preferably quite slowly, to cause the nut 18 and the shutter 38 to move downwardly on the screw 19. This causes the top edge of said shutter to move downwardly clear of the path permitting light rays to pass from lamp 32 to cell 31, thus activating the latter to close a downward inching circuit from lead 91 to lead 93, including switches 92 and 87, wire 90, cell 31, wire 143, coil 110, wire 112, and then closed contactors 120c and 130a. This circuit energizes coil 110, thereby closing contactors 110b and 110c to energize solenoid 66 and cause the slide 15 to move downwardly in the manner already described.

If the operator has turned the wheel 22 only to such an extent as to cause a downward movement of the nut 18 of, say, one inch, upon the screw 19, the press slide 15, in moving downwardly to the extent of one inch carries the cell assemblies to their original positions relatively to the shutter 38 so that light is again cut off from cell 31, thereby deactivating it to open the mentioned downward inching circuit through coil 110. The opening of said downward inching circuit deenergizes the coil 110 and opens contactors 110b and 110c, thereby deenergizing solenoid 66 and permitting spring 73 to restore valve piston 49a to its neutral position to bring the press slide to rest.

To inch the slide upwardly, the operator turns the wheel 22 to move the nut 18 upwardly to the extent of, say, three-fourths of an inch, carrying the bottom edge of shutter 38 upwardly clear of the path permitting light rays to pass from lamp 37 to cell 36, thus activating the latter to close an upward inching circuit from lead 91 to lead 93, including switches 92 and 87, wire 90, cell 36, wire 144, coil 120, wire 123, limit switch 74, wire 124, and then closed contactor 110d. This circuit energizes coil 120, thereby closing contactors 120d and 120e to energize solenoid 67 and cause the slide 15 to move upwardly in the manner already described.

Thereafter, the press slide 15, in moving upwardly to the same extent as the upward movement of the nut 18 (three-fourths of an inch in the present illustration), carries the cell assemblies to their original positions relatively to the shutter 38 so that light is again cut off from cell 36, thereby deactivating it to open the mentioned upward inching circuit through coil 120. The opening of said upward inching circuit deenergizes the coil 120 and opens contactors 120d and 120e, thereby deenergizing solenoid 67 and permitting spring 73 to restore valve piston 49a to its neutral position to bring the press slide to rest.

The foregoing explanation presupposes that the operator will cause the nut 18 to move upwardly or downwardly only a short distance at a time or only slightly in advance of the press slide 15 which, in inching operation, will follow the nut. Recognizing the possibility, however, that an operator might turn the wheel 22 so rapidly as to cause the shutter to move far ahead of the press slide and consequently uncover both cells, rendering the inching controls inoperative for a time, the toggle switches 28, 29, shown in the drawings in closed positions indicated in full lines, are so arranged that if the nut 18 moves upwardly substantially in advance of the slide 15, the pin 41 engages the operating arm of toggle switch 28 and opens the latter, the effect of which, as may be seen from Fig. 5 is to break the circuit through lamp 32 and thus render cell 31 inoperative while cell 36 remains subject to lighted lamp 37. The follow-up movement of the slide 15 causes the switch 28 to be closed again as the slide approaches the position wherein the shutter again closes off the light to both cells. The pin 41 functions in a similar manner to open switch 29 and render cell 36 inactive if the nut 18 is moved downwardly substantially in advance of the press slide and to close said switch again as the result of the follow-up movement of the press slide.

The described characteristic operation of the toggle switches 28, 29 serves to yield the previously mentioned automatic movement of the slide 15 to aligned position relatively to the nut 18 when the operator sets the switch 87 to "jog" position to start inching operation. It should be clear that, when the press is in running operation, the toggle switch 29 is closed and the toggle switch 28 is opened by the pin 41 as the slide 15 moves downwardly to and below a position of substantial alignment relatively to the nut 18; and as the slide moves upwardly to and above such aligned position the said pin closes switch 28 and opens switch 29. Hence, if the slide is not in the mentioned aligned position when the operator sets the switch 87 at "jog" position, the mentioned setting of the latter switch serves to light only one of the lamps 32 or 37 so that only the cell 31 or 36, which will yield the proper direction of movement of the slide to bring the latter to such aligned position, will be activated to automatically achieve such alignment. This automatic initial movement of the slide to aligned position, at the beginning of inching operation, is advantageous in facilitating operation of the press.

It is evident from the foregoing description that an operator of the disclosed press system may convert the controls, as between automatic or semi-automatic and inching operation, merely by shifting the setting of run-jog switch 87; also that the present invention affords such precise control of the press slide that the latter may be caused to move to substantially the same minute extent that the nut 18 may be moved.

In order to render the disclosure of the present invention as free of complexities as possible, consistent with a complete understanding thereof, the several photoelectric cells have been illustrated and described as connected directly in the circuits of the relay coils 110 and 120. Persons familiar with such cells will readily understand, however, tht photoelectric cells, suitable for use in the present invention, may be connected in circuit with suitable amplifiers and the latter may be connected in the circuits of the said relay coils.

The second embodiment

Fig. 6 illustrates an arrangement wherein angularly disposed mirrors 150, 151 may be fixed upon the extension 27 on one end of the press slide in such position that, except as closed off by the shutter 38, light rays from the lamps 32, 37 may pass to their respective related cells 31, 36. The cell 31 and its housing may be fixed in a suitable position upon the crown 13 of the press and the cell 36 and its housing may be fixed in a suitable position upon the bed 11 of the press. The positioning of the cells on fixed portions of the press renders them less likely to be damaged by shocks and heavy vibrations which may be set up in the slide 15 during operation of the press.

In the second embodiment, the same arrangement of toggle switches 28, 29 may be employed to function the same and with the same results described with reference to the first embodiment of the invention. Indeed, all parts of a press system employing the second embodiment, excepting the parts illustrated in Fig. 6, may be the same as those illustrated and described with reference to the first embodiment and may function in a similar manner.

It should be understood that this invention may be employed in various types of press systems and may be modified in many respects while, nevertheless, remaining within the invention as defined in the following claims.

What I claim is:

1. In a fluid-actuated device having a fluid-actuated reciprocating tool-carrying member adapted in normal operation to execute relatively rapid uninterrupted movements; electrical control means for controlling the movement of said member, comprising first operating means adapted to operate the said electrical control means to derive such normal operation of the tool-carrying member, and second operating means, adapted to operate said electrical control means to derive inching operation of the tool-carrying member, the said second operating means having portions thereof constrained at all times to move in unison with said member, and an element, movable manually independently of the mentioned portions and arranged to coact with the latter, in response to such manual movement, to initiate movement of the tool-carrying member and to coact with said portions in response to the latter movement of said member to terminate movement of the tool-carrying member.

2. In a fluid-actuated device having a fluid-actuated reciprocating tool-carrying member adapted in normal operation to execute relatively rapid uninterrupted movements; control means, including electrical apparatus, partly carried upon said member for controlling the movement of said member, comprising primary operating means adapted to operate the said control means to derive such normal operation of the tool-carrying member and secondary operating means adapted to operate said control means to derive manually limited movement of the tool-carrying member, the said secondary operating means including a second member manually movable independently of said tool-carrying member and adapted to coact with portions of said electrical apparatus carried upon said tool-carrying member, in response to movement of the said second member, to operate said apparatus whereby to derive movement of the said reciprocating member to an extent dependent upon the extent of movement of said second member.

3. The combination according to claim 2, further characterized in that said electrical apparatus includes a photoelectric cell, carried upon one of said members, and in that a shutter member is carried upon the other of said members and adapted to control the operation of said cell in response to relative movement of the said tool-carrying member and the mentioned second member.

4. The combination according to claim 2, further characterized in that mechanically operable portions of said electrical apparatus are carried upon one of said members, and are adapted to be operated by a portion of the other of said members.

5. A hydraulically actuated device comprising a liquid-actuated reciprocable tool-carrying member adapted in normal operation to execute relatively rapid uninterrupted movements, electrical control means partly carried upon said member for controlling the initiation of supply of liquid, actuating said member, whereby to initiate movement of the latter and for controlling the termination of such liquid supply whereby to terminate the movement of said member, first operating means adapted to operate said electrical control means to derive such normal operation of the tool-carrying member, and second operating means comprising a second member operably movable, independently of said tool-carrying member under minute manual control, along a course substantially parallel to the course of movement of the latter member, and adapted to coact with portions of the electrical control means carried upon said tool-carrying member in response to a variation in the relative positions of the two said members, whereby to operate the electrical control means to start said tool-carrying member and stop it precisely at a desired intermediate point in its stroke.

6. A hydraulically actuated device comprising a liquid-actuated reciprocable tool-carrying member adapted in normal operation to execute relatively rapid uninterrupted movements, electrical control means partly carried by said member for controlling the termiation of the supply of actuating liquid to said member, whereby to terminate the latter's movement, first operating means adapted to operate said electrical control means to terminate the movement of said member at the end of a substantially full stroke, and second operating means, for operating said control means, comprising a second member operably movable, independently of said tool-carrying member under minute manual control, along a course substantially parallel to the course of movement of the latter member, and adapted to coact with portions of the said control means carried upon said tool-carrying member, in response to movement of the latter to an extent dependent upon the extent of a preceding movement of said second member, whereby to terminate the movement of the tool-carrying member precisely at a desired intermediate point in its stroke.

7. In a hydraulically actuated device having a tool-carrying slide member adapted in normal operation to execute relatively rapid uninterrupted movements, ram means connected to and adapted to move said slide member, and liquid control means for controlling the delivery of liquid to said ram whereby to control the movement of the slide member; primary control means, including electrical apparatus, for controlling the operation of the said liquid control means to derive such normal operation, and secondary control means comprising a second member, operably movable relatively to said slide member under minute manual control; portions of said electrical apparatus being carried by one of said members and being adapted to be operated, in response to relative movement of said two members, by a portion of the other of said members whereby to derive minutely controlled inching movement of said slide member.

8. In a hydraulically actuated device having a tool-carrying slide member adapted in normal operation to execute relatively rapid uninterrupted movements, and a ram connected to and adapted to move said slide member; control means, including electrical apparatus, for controlling the delivery of liquid to said ram whereby to control the movement of said slide member, first operating means adapted to operate the said electrical apparatus to derive such normal operation of the slide member, second operating means adapted to operate the said electrical apparatus to derive inching operation of the slide member; the said second operating means comprising a make and break mechanism, adapted to control said electrical apparatus, and a second member, operably movable relatively to said slide member under minute manual control, and having a portion coacting with the make and break mechanism, in one relationship of the two members, to render the control means ineffective to yield movement of the slide member, and being adapted, upon movement of the said second member from said relationship, to coact with said make and break mechanism whereby to cause a following movement of the slide member to an extent dependent upon the extent of such movement of the said second member.

9. A device according to claim 8, further characterized in that the said make and break mechanism comprises a photoelectric cell, and the said second member has a shutter element mounted thereon and adapted, in said one relationship of the two members, to so influence said cell as to yield no resulting movement of the slide member, and being further adapted, upon movement of said second member from said relationship, to so influence said cell as to cause a following movement of the slide member to an extent dependent upon the extent of such movement of the said second member.

10. A device according to claim 8, further characterized in that the said make and break mechanism comprises a pair of photoelectric cells, and the said second member has a shutter element mounted thereon and adapted, in said one relationship of the two members, to coact with both said cells to yield no resulting movement of the slide member, and being further adapted, upon movement of said second member in one direction from said one relationship, to so influence one of said cells as to cause a following movement of the slide member in the same direction, and adapted, upon movement of said second member in an opposite direction from said relationship to so influence the other of said cells as to cause a following movement of the slide member in the said opposite direction.

11. In a hydraulically actuated device having a slide member, and a ram connected to and adapted to move said slide member; control means, including electrical apparatus, for controlling the delivery of liquid to said ram whereby to control the movement of said slide member, the said control means comprising a make and break mechanism, adapted to control said electrical apparatus, a second member, operably movable relatively to said slide member, and having a portion coacting with the make and break mechanism, in one relationship of the two members, to render the control means ineffective to yield movement of the slide member, and being adapted, upon movement of the said second member from said relationship, to coact with said make and break mechanism whereby to cause a following movement of the slide member to an extent dependent upon the extent of such movement of the said second member, the said make and break mechanism, further, comprising two photoelectric cells adapted to control movement of the press slide in opposite directions, a shutter element on said second member adapted to control the activation and deactivation of said cells, separate switches, each connected in circuit with one of said cells, and a portion of said second member adapted, when the shutter element changes the condition of one of said cells, to operate the said switch in circuit with the other of said cells, whereby to render the latter non-responsive to the shutter element.

12. In a hydraulic press having a reciprocating tool-carrying slide, adapted in normal operation to execute relatively rapid uninterrupted movements, and a ram connected to and adapted to move said slide; primary control means for yielding such normal operation, inching control means comprising an electrical make and break mechanism carried by said slide and adapted to coact with said primary control means to control the inching movement of the slide, a rotatable screw extending substantially parallel to the line of movement of said slide, a nut threaded upon said screw and restrained against rotation whereby to be moved along said screw under minute control in response to rotation thereof, and a portion of said nut being adapted, upon such movement of the latter from an initial relationship to the slide, to coact with said make and break mechanism to initiate a following movement of the slide, and further adapted, upon movement of the slide to an extent dependent upon the movement of the nut, to again coact with said make and break mechanism whereby to terminate such following movement.

13. Control means according to claim 12, further characterized in that the make and brake mechanism comprises a photoelectric cell adapted to control the movement of the press slide, and the mentioned portion of said nut comprises a shutter element adapted to control the passage of light to said cell in response to relative movement of the said nut and the press slide.

14. In a hydraulic press having a reciprocating slide, and a ram connected to and adapted to move said slide; inching control mechanism comprising an electrical make and break mechanism carried by said slide and adapted to control the movement thereof, a rotatable screw extending substantially parallel to the line of movement of said slide, a nut threaded upon said screw and restrained against rotation whereby to be moved along said screw in response to rotation thereof, and a portion of said nut being adapted, upon such movement of the latter from an initial relationship to the slide, to coact with said make and break mechanism to initiate a following movement of the slide, and further adapted, upon movement of the slide to an extent dependent upon the movement of the nut, to again coact with said make and break mechanism whereby to terminate such following movement, the said make and break mechanism comprising a pair of make and break devices adapted to control the movement of the press slide in opposite directions, the inching control mechanism also including separate switches, each connected in circuit with one of said make and break devices, and the said nut also comprising a second portion adapted, when said nut is moved in one direction, to coact with the switch in circuit with the device controlling movement of the slide in the opposite direction, to render the last mentioned of said devices non-responsive to further movement of said nut.

15. In a hydraulic press having a reciprocating slide, and a ram connected to and adapted to move said slide; inching control mechanism comprising an electrical make and break mechanism carried by said slide and adapted to control the movement thereof, a rotatable screw extending substantially parallel to the line of movement of said slide, a nut threaded upon said screw and restrained against rotation whereby to be moved along said screw in response to rotation thereof, and a portion of said nut being adapted, upon such movement of the latter from an initial relationship to the slide, to coact with said make and break mechanism to initiate a following movement of the slide, and further adapted, upon movement of the slide to an extent dependent upon the movement of the nut, to again coact with said make and break mechanism whereby to terminate such following movement, the said make and break mechanism comprising a pair of photoelectric cells adapted to control the movement of the press slide in opposite directions, the mentioned portion of said nut comprising a shutter element adapted to control the passage of light to said cells in response to relative movement of the said nut and the press slide, the inching control mechanism including separate switches, each connected in circuit with one of said cells, and the said nut comprises a second portion adapted, substantially when one of said cells is rendered effective to derive movement of the press slide, to coact with the switch in circuit with the other of said cells, to render the latter non-responsive to continued movement of said nut.

16. In a hydraulic press having a reciprocating slide, a ram connected to and adapted to move said slide, and a hydraulic system adapted to direct liquid under pressure upon either of opposite surfaces of said ram to derive movement of the press slide in either of opposite directions; electrical inching control means for controlling the hydraulic system to derive such opposite slide movements comprising a pair of photoelectric cells carried by said slide and adapted to selectively control the said electrical means to yield such opposite slide movement, a rotatable screw extending substantially parallel to the line of movement of said slide, a nut adapted to move along said screw in response to rotation of the latter, a shutter element carried by said nut and adapted to control the passage of light to said cells, separate switches, each connected in circuit with one of said cells, and a switch-actuating element carried by said nut, whereby movement of said nut from an initial position relatively to said slide renders one of said cells operative to yield a following movement of the slide in a similar direction, and causes the said switch-actuating element to coact with the switch in circuit with the other of said cells, to render the latter non-responsive to continued movement of said nut.

17. A fluid-actuated device having a fluid-actuated reciprocating tool-carrying member adapted in normal operation to execute relatively rapid uninterrupted movements and electrical means for controlling the normal operation and the inching operation of said member, the said control means comprising photoelectric means constrained at all times to move in unison with said member and adapted to coact with said electrical means to yield inching operation of said member, light-source means disposed in position to throw light upon said photoelectric means, a second member manually movable independently of said tool-carrying member, and a shutter constrained at all times to move in unison with said second member and adapted to control the passage of light to said photoelectric means in response to movement of said second member, to yield a following movement of said tool-carrying member to an extent dependent upon the said movement of the second member.

18. A fluid actuated device comprising a fluid actuated reciprocating tool-carrying member; controls, including electrical apparatus, for controlling the inching operation of said device; controls for controlling operation other than inching operation of said device in which other operation the said die-carrying member is adapted to execute relatively rapid uninterrupted movements; and readily changeable means for converting control of the device as between the mentioned types of operation thereof; the said inching operation controls including a member, operably movable independently of the said tool-carrying member under minute manual control, and adapted to coact with portions of said electrical apparatus in response to relative movement of the two said members, whereby to control minutely the inching movement of the said tool-carrying member, the device being further characterized in that the mentioned inching operation controls comprise a photoelectric cell assembly, which, when the said reciprocating member is in a position other than in substantial alignment relatively to said independently movable member, is adapted to cause movement of the said reciprocating member to such aligned position, in response to changing of the said control converting means to a condition controlling inching operation of the device.

19. A fluid actuated device comprising a fluid actuated reciprocating tool-carrying member; controls, including electrical apparatus, for controlling operation other than inching operation of said device in which other operation the said die-carrying member is adapted to execute relatively rapid uninterrupted movements; and readily changeable means for converting control of the device as between the mentioned types of operation thereof; the said inching operation controls including a member, operably movable independently of the said tool-carrying member under minute manual control, and adapted to coact with portions of said electrical apparatus in response to relative movement of the two said members, whereby to control minutely the inching movement of the said tool-carrying member, the device being further characterized in that the mentioned inching operation controls comprise two photoelectric cells adapted to control movement of the tool carrying member in opposite directions, a shutter carried by said independently movable member and adapted to control the passage of light to said cells, and separate switches, each connected in circuit with one of said cells; a portion of the said independently movable member being adapted to open one of said switches to render inoperative the cell in circuit therewith when the tool-carrying member moves in one direction beyond a position of substantial alignment with the independently movable member, and to open the other of said switches to render inoperative the cell in circuit therewith when the tool-carrying member moves in the other direction beyond a position of substantial alignment with the independently movable member, thereby leaving, subject to activation, only the one cell adapted to control the movement of the tool-carrying member in the direction which, when the control converting means are shifted to the setting yielding inching operation, causes the tool-carrying member to move automatically to a position of substantial alignment with the mentioned independently movable member.

20. The combination, in a fluid-actuated device having a fluid-actuated reciprocating tool-carrying member and means for controlling the flow of fluid to said device for governing the movement of said member; of an electrical device for operating said flow-control means to start and stop the said member, an electric circuit through said electrical device, first circuit-control means adapted to operate said circuit substantially upon termination of a stroke of said member whereby to control the operation of said electrical device to stop said member, and second circuit-control means having a first portion manually movable independently of said tool-carrying member, and a second portion constrained at all times to move in unison with the tool-carrying member, the said second circuit-control means being adapted to operate said circuit at any intermediate point in the stroke of said member, in response to relative movement of the mentioned two portions of the second circuit-control means, whereby to operate the said electrical device to derive intermediate movement of said member to an extent dependent upon the extent of independent movement of said second circuit-control means.

21. The combination according to claim 20, further comprising an electric selection switch adapted to render either of said circuit-control means operative and the other thereof inoperative.

22. The combination according to claim 20, further characterized in that the mentioned second portion of the second circuit-control means comprise photoelectric means adapted to modify said electric circuit to control the operation of said electrical device and said flow-control means, and the said first portion of the second circuit-control means comprises a shutter adapted to control the passage of light to the photoelectric means.

23. The combination, in a fluid-actuated device having a fluid-actuated reciprocable tool-carrying member and means for varying the flow of fluid to said device for governing the reciprocation of said member; of electrically operable means for operating said flow-varying means to derive movement of said member in opposite directions, an electric system associated with said operating means, first circuit-control means adapted to operate said system whereby to control the operation of said operating means to derive uninterrupted movement of the member through a substantially full stroke in either of opposite directions, and second circuit-control means including photoelectric means and shutter means, coacting therewith, one of the two last recited means being constrained at all times to move with the tool-carrying member, and the other of said two last recited means being manually movable independently of said tool-carrying member in opposite directions, and adapted to modify the operation of said photoelectric means, and thereby operate said system, at any point in the stroke of said tool-carrying member in either direction, in response to relative movement of said shutter means and the tool-carrying member, whereby to derive movement of the latter member to an extent and direction independent upon the extent and direction of independent movement of said independently movable means.

EARL CANNON.